A. N. ADAMS.
GEARING.
APPLICATION FILED NOV. 10, 1909.
958,061.
Patented May 17, 1910.
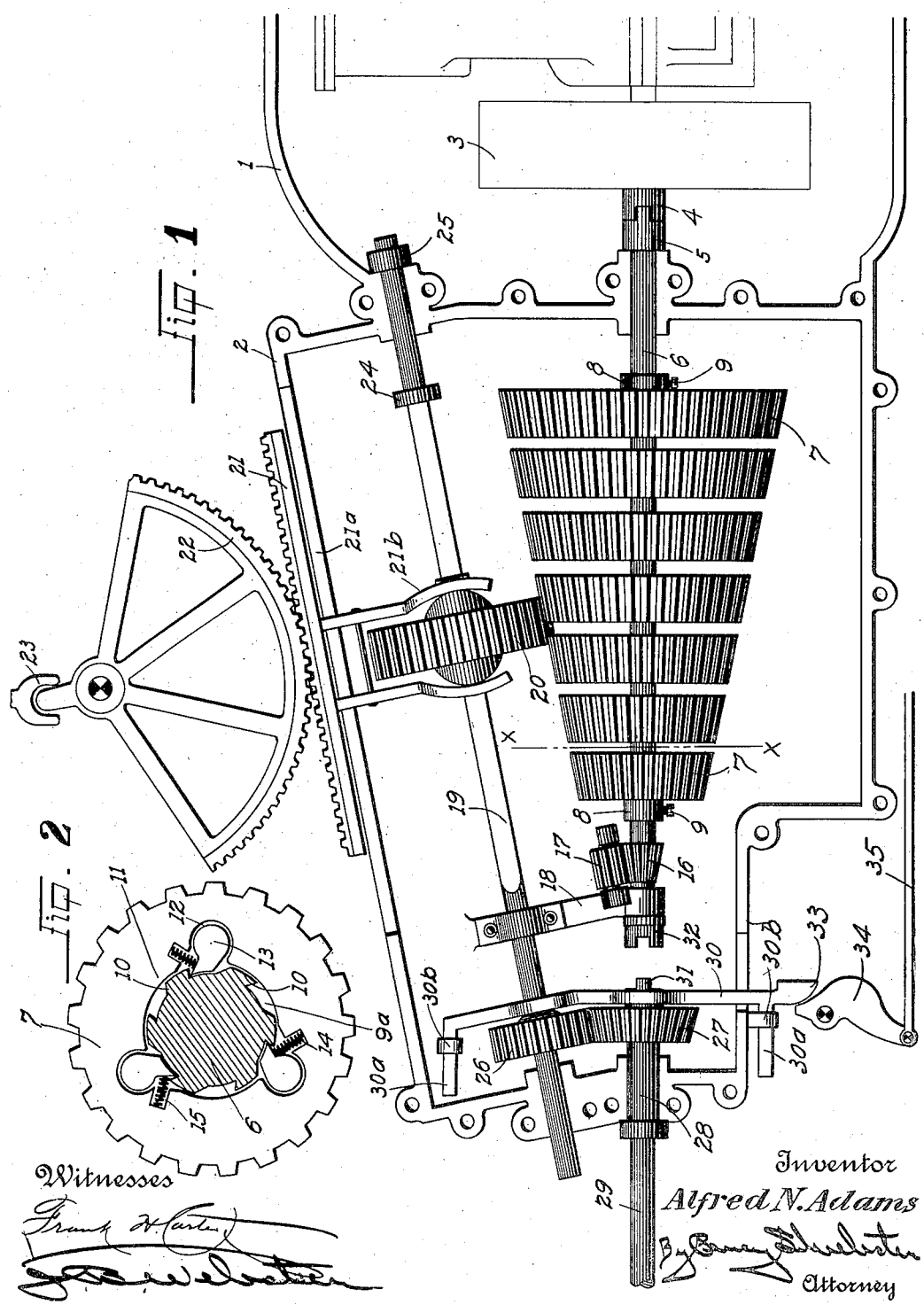

UNITED STATES PATENT OFFICE.

ALFRED N. ADAMS, OF STOCKTON, CALIFORNIA.

GEARING.

958,061.  Specification of Letters Patent.  Patented May 17, 1910.

Application filed November 10, 1909. Serial No. 527,167.

*To all whom it may concern:*

Be it known that I, ALFRED N. ADAMS, a citizen of the United States, residing at Stockton, in the county of San Joaquin, State of California, have invented certain new and useful Improvements in Gearings; and I do declare the following to be a full, clear, and exact description of the same, such as will enable others skilled in the art to which it appertains to make and use the same, reference being had to the accompanying drawings, and to the characters of reference marked thereon, which form a part of this application.
This invention relates to gearings for any kind or character of power driven mechanism and particularly to the change speed gearings thereon, the object of the present invention being to produce a change speed gearing which will comprise a cone formed of gears with a shifting gear moving over them, the connection of the cone gears with their shaft being such as will permit the shifting gear to intermesh with two of said cone gears without pinching or otherwise damaging them by reason of the different speeds which they would naturally be running. It might be especially noted at this time that the novelty especially claimed is the element of the cones and shift gear being geared instead of friction surfaces, as are most cone shaped change speed gears.

A further object of the invention is to produce a simple and inexpensive structure and yet one which is exceedingly effective for the purpose for which it is designed.

These objects I accomplish by means of such structure and relative arrangement of parts as will fully appear by a perusal of the following specification and claims.

In the drawings, similar characters of reference indicate corresponding parts in the several views.

Figure 1 is an interior view of a transmission case showing my improved structure therein. Fig. 2 is an enlarged sectional view taken on a line $x$—$x$ of Fig. 1.

Referring now more particularly to the characters of reference on the drawing, 1 designates the engine casing, and 2 the transmission casing, and 3 the fly wheel of the engine driven by its shaft 4, which is clutched or otherwise connected as shown at 5 to the main driving shaft 6 on which is formed a change speed cone consisting of a plurality of cone shaped gears 7 held in fixed position by collars 8 fixed to the shaft 6 by set screws 9.

On the shaft 6 with each gear 7 are a plurality of grooves $9^a$ forming lugs 10 and in an interior solid portion 11 of the gears 7 are a plurality of recesses 12 in which are disposed dogs 13 engaging said lugs 10, the normal engagement position of said dogs with said lugs being maintained by springs 14 connected between said dogs 13 and the bottom of recesses 15 in the portion 11.

On the shaft 6 below the gears 7 is a rigid gear 16 driving an idle gear 17 alined with the edge of the cone gears 7 whereby a shift gear 20 on a driven shaft 19 can readily engage said gear 17 to perform a reverse motion of the mechanism, the space between said gear 17 and said gear 7 being the neutral point in the mechanism where no motion is transmitted to the machinery. The shift gear 20 is operated by a gear rack 21 having a shifting yoke $21^b$ moving in a slot $21^a$ in the casing 2, said rack 21 being operated by a gear quadrant 22 having an operating lever 23. From the neutral point the shift gear 20 moves onto the lowest or smallest of the gears 7 which is low speed, and the speed is gradually increased by moving the gear 20 up the cone gears 7 until the highest and largest one is reached which is high speed on the cone. As the gear 20 shifts from one of the gears 7 to the other, it is naturally intermeshed with two gears at one time, and as one being larger than the other is naturally covering a greater area with each revolution, the result would be disastrous were it not for my lug and dog mechanism which permits the gear 20 to transmit the increased motion to the lesser gear independently of the motion of the shaft 6, the motion of which is transmitted only through its engagement of the lugs 10 with the dogs 13, which permits the said gear 7 to move faster independently of its shaft 6. As the gear 20 leaves the last of the gears 7 which gives the high speed of the gears 7, its yoke $21^b$ strikes a collar 24 on the shaft 19, and moves said shaft 19 through its bearings in the casing 2 and moves its transmission gear 26 out of engagement with its corresponding gear 27 on a sleeve 28 on the drive shaft 29 and incidentally shifts a bar 30 on the sleeve 28 to carry a clutch 31 on said sleeve into an engagement with a clutch 32 on the shaft 6, thus giving the direct drive and speed of the engine to the shaft 29. This same result is also obtainable when the gear 20 is at the neutral point, by operating a rod 35 operated by any suitable foot lever, (not shown) to cause a cam 34 to engage a dog 33 on the clutch bar 30 to shift said bar to engage the clutches 31 and 32, without unmeshing gears 26 and 27. The bar 30 has guide arms 30$^a$ moving through guides 30$^b$.

From the foregoing description it will be readily seen that I have produced such a change speed device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:

1. A gearing comprising a driving shaft, a cone on said shaft comprising a plurality of independent gears, a shift gear moving over said cone gears, means for isolating said shift gear from said cone gears, a driven shaft and means for engaging said driven shaft with said driving shaft when said gears are isolated.

2. The combination of a driving shaft and a driven shaft, a plurality of beveled gears on said driving shaft arranged end to end and having a direct connection with said driving shaft, a driven gear, means within said beveled gears to enable one of lesser diameter to rotate faster than said driving shaft and adjacent beveled gear of greater diameter, while said lesser and greater beveled gears are simultaneously in engagement with the said driven gear, a third shaft, gears on said driven and third shaft normally engaging each other and means for disengaging said last two gears.

3. A gearing comprising a driving shaft and a driven shaft, a plurality of independent beveled gears on said driving shaft, a shifting gear on said driven shaft moving over said beveled gears, means within said beveled gears to allow them to compensate with each other when two of them are in mesh with the driven gear at one time, a third shaft, a driving means from said driven shaft to said third shaft, means for isolating said driven gear from said beveled gears, and means for connecting said third shaft with said driving shaft when said gears are isolated.

In testimony whereof I affix my signature in presence of two witnesses.

ALFRED N. ADAMS.

Witnesses:
   PERCY S. WEBSTER,
   JOSHUA B. WEBSTER.